United States Patent [19]

Romann

[11] 4,397,179
[45] Aug. 9, 1983

[54] DEVICE FOR MEASURING THE MASS OF A FLOWING MEDIUM

[75] Inventor: Peter Romann, Stuttgart, Fed. Rep. of Germany

[73] Assignee: Robert Bosch GmbH, Stuttgart, Fed. Rep. of Germany

[21] Appl. No.: 259,315

[22] Filed: Apr. 30, 1981

[30] Foreign Application Priority Data

May 2, 1980 [DE] Fed. Rep. of Germany ....... 3016923

[51] Int. Cl.³ .............................................. G01F 1/68
[52] U.S. Cl. ........................................ 73/118; 73/204
[58] Field of Search .............................. 73/204, 118 A

[56] References Cited

U.S. PATENT DOCUMENTS

| | | | |
|---|---|---|---|
| 3,286,174 | 11/1966 | Schaschl | 73/204 |
| 3,971,247 | 7/1976 | Rodder | 73/204 |
| 4,196,622 | 4/1980 | Peter | 73/204 |
| 4,213,335 | 7/1980 | Peter et al. | 73/204 |
| 4,252,016 | 2/1981 | Sauer et al. | 73/204 |
| 4,338,814 | 7/1982 | Romann | 73/204 |

Primary Examiner—Herbert Goldstein
Attorney, Agent, or Firm—Edwin E. Greigg

[57] ABSTRACT

A device is proposed for measuring the mass of a flowing medium, in particular for measuring the mass of air aspirated by an internal combustion engine. The device is provided with a temperature-dependent resistor disposed in the flow of the medium, whose temperature and/or resistance is regulated in accordance with the mass of the medium; the control variable represents a standard for the mass of the medium. The temperature-dependent resistor is embodied as a hot strip or a hot wire and is held via at least three support points. The central support point located between the two terminal support points is embodied as elastically yielding, such that forces engaging the hot strip or hot wire do not cause any permanent deformation thereof. Accordingly, the destruction of the hot strip or hot wire, as well as changes in the characteristic measuring curve, are prevented.

10 Claims, 7 Drawing Figures

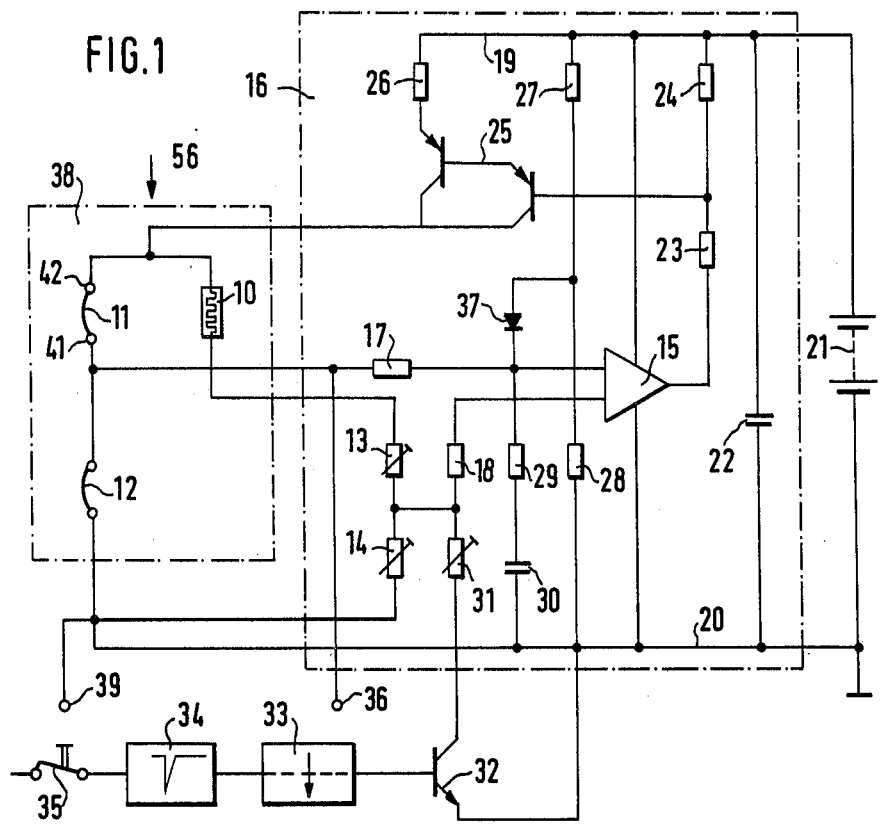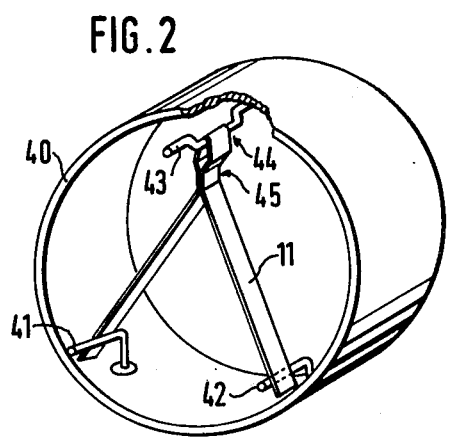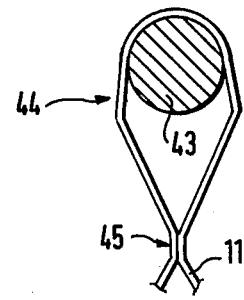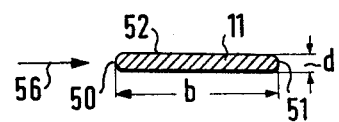

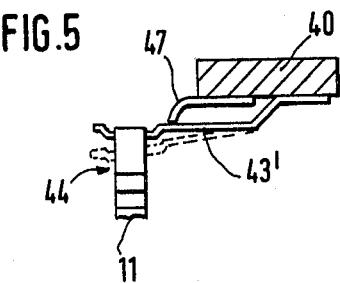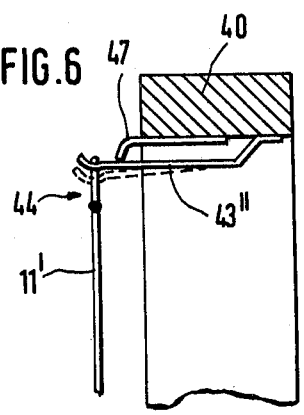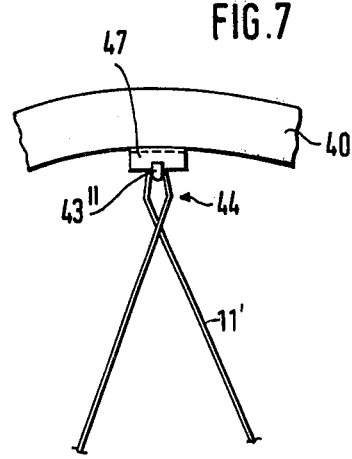

DEVICE FOR MEASURING THE MASS OF A FLOWING MEDIUM

BACKGROUND OF THE INVENTION

The invention is directed to improvements in devices for measuring the mass of a flowing medium using a temperature-dependent resistor in the flow path. Such a device for measuring the mass of a flowing medium in which a hot wire or hot strip is used as the temperature-dependent resistor is known in the art. The hot wire or hot strip is tautly suspended over a multiplicity of fastening points in a sensor ring. Such a device may be subjected to forces in extreme cases (impact, vibration, temperature stresses), which cause the permissible tension in the hot wire or hot strip to be exceeded. As a result, a permanent deformation of the hot wire or hot strip occurs, which unacceptably increases the resistance value of the temperature-dependent resistor.

OBJECT AND SUMMARY OF THE INVENTION

It is a principal object of the invention to provide a device, having the advantage over the prior art that undesirable permanent deformation of the hot wire or hot strip is avoided, thus preventing not only an undesirable change in the characteristic measurement curve of the sensor but also the ultimate destruction of the hot wire or hot strip.

A further object of the invention is to provide for a means which elastically yields while supporting the hot strip or hot wire so that permanent deformation is not transmitted by impact or vibration shock to the flow sensor.

The invention will be better understood and further objects and advantages thereof will become more apparent from the ensuing detailed description of preferred exemplary embodiments taken in conjunction with the drawings.

BRIEF DESCRIPTION OF THE DRAWINGS

FIG. 1 is a circuit diagram of the device following the invention for measuring the mass of a flowing medium, in particular for measuring the mass of air aspirated by internal combustion engines;

FIG. 2 is a perspective view of a hot strip positioned in the form of a V through three support points;

FIG. 3 is a partial sectional view of the hot strip shown in FIG. 2 only in the vicinity of a central support point;

FIG. 4 is a cross section through the hot strip;

FIG. 5 shows one embodiment of a central support point for the hot strip in accordance with the invention, along with a hot strip;

FIG. 6 shows another embodiment of a central support point for a hot wire in accordance with the invention, along with a hot wire; and FIG. 7 is a partial elevational view showing the suspension of a hot wire on a central support point in accordance with the invention.

DESCRIPTION OF THE PREFERRED EMBODIMENTS

Referring to the drawings, FIG. 1 shows a device for measuring the mass of a flowing medium, which is intended particularly for measuring the aspirated air in internal combustion engines. A bridge circuit is provided comprising a temperature-dependent resistor 10, a temperature-dependent resistor 11 or 11', a resistor 12 and resistors 13 and 14. A control amplifier 15 of a closed-loop control device 16 is connected to the diagonal of the bridge. The inverting input of the control amplifier 15 is connected via an input resistor 17 with the junction of the resistors 11 or 11' and 12, while the noninverting input of the control amplifier 15 is connected via an input resistor 18 to the junction point of the resistors 13 and 14. The control amplifier 15 is connected via two supply lines 19 and 20 to a source of direct-current voltage 21. This direct-current voltage source 21 is switched in parallel to a smoothing capacitor 22. The output of the control amplifier 15 is connected with the series circuit comprising two resistors 23 and 24, with the resistor 24 being connected to the common supply line 19. These two resistors 23 and 24 represent a voltage divider for a Darlington circuit 25, which together with a resistor 26 form a voltage-controlled current source for supplying the bridge circuit made up of resistors 10, 11, 11', 12, 13 and 14 with electric current. A voltage divider comprising the resistors 27 and 28 is switched between the common supply lines 19 and 20. The anode of a diode 37 is connected to the junction of the resistors 27 and 28, and the cathode of this diode 37 is connected with the inverting input of the control amplifier 15. The series circuit comprising a resistor 29 and a capacitor 30 is switched between the inverting input of the control amplifier 15 and the common supply line 20; this resistor-capacitor combination serves the purpose of tuning the frequency of the closed-loop control circuit to the time-dependent behavior of the temperature-dependent resistors.

A resistor 31 is connected to the junction of the resistors 13 and 14 and can be connected, via the switching path of a switching transistor 32 with the common supply line 20. The base of the switching transistor 32 is connected with the output of a monostable multivibrator 33, which is triggerable via a differentiation element 34, either by an ignition switch indicated at 35, for the ignition system of the engine or by a pulse furnished by some other means.

The mode of operation of the device described is as follows:

A predetermined electric current flows over the temperature-dependent resistor 11, 11' of the bridge circuit and heats this resistor 11, 11' up to its normal operating temperature. In another branch of the bridge circuit, the the temperature-dependent resistor 10 assumes a resistance value which characterizes the temperature of the flowing medium, for instance the aspirated air of the engine. What is attained as a result is that it is the temperature of the aspirated air of an engine which is always used as a reference signal for the closed-loop control of the heating current of the device for air flow measurement. Depending on the mass of the aspirated air flowing past the resistor, the temperature-dependent resistor 11, 11' is cooled to a greater or lesser extent. This cooling phenomenon causes an imbalance in the bridge circuit. This imbalance in the bridge circuit is then regulated so that the control amplifier 15 furnishes a higher supply current to the bridge circuit via the voltage-controlled current source 23, 24, 25 and 26; thus the temperature of the temperature-dependent resistor 11, 11', and accordingly its resistance value, can be held to a level which is at least approximately constant. The current flowing through the bridge circuit sets a standard for the air mass flowing past the temperature-dependent resistor 11, 11' in the direction of the arrow 56 (see FIG. 2). A corresponding electrical signal may be picked up between a terminal 36 and a terminal 39.

In order to make it simpler to start up the closed-loop control apparatus, the voltage divider 27, 28 is provided with the diode 37. When the closed-loop control apparatus is switched on, a voltage of approximately 0.5 volts is brought about at the inverting input of the control amplifier 15; this voltage permits reliable starting up of the control apparatus. During normal operation, however, the voltage at the inverting input of the control amplifier 15 will be substantially higher than this initial voltage, so that the diode 37 is blocked and thus the voltage divider 27, 28 can have no influence upon the closed-loop control procedures.

In order from time to time to remove deposits from the surface of the hot strip 11 or hot wire 11', as the temperature-dependent resistor will be described hereinafter, an increased electric current is intended to flow over this temperature-dependent resistor 11, 11' after a predetermined measurement cycle. A particular duration of engine operation, for instance, may be selected as the predetermined measurement cycle. Alternatively, burn-off procedure may be triggered each time the ignition system of the engine is shut off. This occurs when the ignition switch 35 is switched off. The corresponding signal is differentiated and directs the monostable multivibrator 33 to assume its unstable switching state. During this unstable switching state of the monostable multivibrator 33, the switching transistor 32 becomes conductive and switches the resistor 31 parallel to the resistor 14 of the bridge circuit. As a result, the bridge circuit comprising the resistors 10, 11, 11', 12, 13 and 14 becomes severely imbalanced, so that the control amplifier 15 furnishes an increased electric current to the bridge circuit in order to compensate for this imbalance. This increased current heats the temperature-dependent resistor 11, 11', for the duration of the unstable switching state of the monostable multivibrator 33, to a temperature which is above the normal operating temperature, so that deposits on the surface of the temperature-dependent resistor burn off.

It has proven to be particularly advantageous for the temperature-dependent resistor 11, 11' to be made from a strip of wire of structurally stabilized platinum, because this material is particularly well suited to being heated to high temperatures. This is particularly important for the burn-off procedure.

It is also advantageous for the reference resistor 12 to be housed in the flow cross section indicated by a broken line 38, such as the intake manifold of the engine, because then the lost heat of the reference resistor 12 can be carried away by the air flowing in the direction of the arrow 56. The resistors 13 and 14 are desirably embodied as adjustable resistors, so that the temperature behavior of the closed-loop control circuit can be adjusted.

In FIG. 2, a sensor 40 is shown schematically as a ring; naturally, the sensor may also be provided in some other useful shape. The sensor has at least three support points 41, 42 and 43 extending substantially parallel to one another. With the aid of the support points 41, 42 and 43, the temperature-dependent resistor 11', embodied here as a so-called hot strip 11, or the hot wire 11' shown in FIGS. 6 and 7, is disposed in the form of a V. The hot strip 11 (or the hot wire 11') is secured with its ends to the two terminal support points 41 and 42 only, as by soldering or welding, for instance, and then guided only loosely over the support point 43. The hot strip 11 is preferably secured to the terminal support points 41, 42 so as to be linearly parallel to the support points, so that the hot strip 11 cannot become twisted, which would cause a change in the transfer of heat and thus in the characteristic curve of the sensor.

The suspension of the hot element 11, 11' in such a manner that it is as free as possible of tensile and compressive stresses is extremely important if the hot strip or the hot wire is intended to be used, for instance, as an air flow rate meter in the intake manifold of an internal combustion engine. The range of temperatures which such hot element must accommodate is generally between −30° C. and +120° C. In addition, a further temperature change, dictated by the mode of operation of the hot strip 11 or the hot wire 11', must also be taken into consideration. Furthermore, the hot wire or hot strip, as has already been noted, must be heated up to a high temperature in order to burn off deposits adhering to its surface. Even this brief increase in temperature causes changes in length on the part of the strip or wire, which, if the hot element were held rigidly in place, could cause undesirable tensile and compressive stresses, with the result that the hot strip 11 or hot wire 11' is permanently stretched and the resistance value increases unacceptably.

As shown in FIG. 2, the support points 41, 42, 43 extending parallel to one another may be bent in hook-like fashion. At least the terminal support points, which serve to carry electric current, are secured in the sensor ring 40 in such a manner that they are electrically insulated from the sensor ring 40. The middle portion of the hot strip 11 or hot wire 11', which is guided about the support point 43, forms a loop 44, while the portions of the hot strip 11 or hot wire 11' which extend to either side of this support point 43 are connected with one another in an electrically conductive manner in contact region 45; this connection may be made by soldering or welding, for example. As a result, the loop 44 is not subject to electric current and thus is not heated up by such a current. The difficulties which normally arise with an indefinite convection of heat away from the hot strip 11 or hot wire 11' the support point 43, where there have been changes in length or displacements of the hot strip 11 or hot wire 11' on the support point 43, are hereby avoided. In accordance with FIG. 3, the wrap angle of the loop 44 is less than 180°.

During vehicle operation, particles floating in the air become deposited on the leading edge of the sensor to form deposits, and, after a short interval of operation, these deposits change the characteristic curve of the sensor, causing incorrect measurements of the air flow or even in extreme cases the destruction of the temperature-dependent resistor. As is also shown in FIG. 4 on a different scale, the temperature-dependent resistor 11 alternatively may be embodied in the form of a band, having an oblong cross section, whose short sides or edges 50, 51 are embodied in a semicircular shape. The thickness of the band is shown as "d" so that the edges 50, 51 are narrow in comparison with the width "b" of the sides 52 of the hot strip 11. In a special case, the ratio of d:b is 1:10, with the actual dimensions being 0.02 mm:0.2 mm. In order to minimize the vulnerability of the hot strip to soiling from deposit formation, the hot element is guided over the support points 41, 42, 43 in the sensor ring 40 in such a manner that one of the edges 50, 51—specifically, as shown in FIG. 4, the edge 50—is oriented to be the exposed edge, facing counter to the direction of the air flow 56, while the sides 52 substantially extend in the flow direction. As a result, the possibility of the sensor as a whole becoming soiled is so greatly reduced that the measurement signal provided by the sensor over long-term use is assured relatively constant. An additional benefit is provided because the destruction of the hot strip can be prevented.

As has already been described above, temperature fluctuations can cause stresses in the hot strip 11 or hot wire 11', resulting in permanent stretching and thus an unacceptable increase in the resistance value. Furthermore, if the hot strip 11 or hot wire 11' is used as an air flow rate meter in a motor vehicle, it is possible for impact, vibrations or backfiring to result in such forces that the stretching limit of the hot strip 11 or hot wire 11' is exceeded, thus causing permanent deformation and an unacceptable increase in the resistance value. It is therefore provided in accordance with the invention, and as shown in FIGS. 5, 6 and 7, that at least one of the support points located between the terminal support points 41 and 42 is embodied as elastically yielding. Specifically, this middle support point 43', 43" is embodied such that, when subjected to forces engaging the hot strip 11 or hot wire 11' it moves, away from the wall of the sensor ring 40 and assumes the position indicated in FIGS. 5, 6 and 7 by broken lines; this yielding of the support point 43', 43" thus prevents stresses from arising in the hot strip 11 or hot wire 11' that could perhaps cause permanent stretching. The support point 43' or 43" is advantageously made of spring steel. The movement of the support point 43' or 43" toward the wall of the sensor ring 40 is suitably restricted by a stop 47. If the support point 43' or 43" is in contact with the stop 47 while the hot strip 11 or hot wire 11' is expanding in consequence of being heated severely, then the loop 44 can lift slightly off the support point 43' or 43" in the direction of the sensor ring 40, without further stress being exerted by the support point 43' or 43" upon the hot strip 11 or hot wire 11'. FIGS. 6 and 7 illustrate the use of a hot wire 11' in the described device in place of a hot strip 11.

Because of the elastically yielding embodiment of the support point 43' or 43", extreme mechanical stress in the hot wire 11' or hot strip 11, which could cause a permanent deformation thereof, is avoided, since the support point 43' or 43" yields elastically before the stretching limit of the hot wire 11' or hot strip 11 is reached.

The foregoing relates to preferred exemplary embodiments of the invention, it being understood that other embodiments and variants thereof are possible within the spirit and scope of the invention, the latter being defined by the appended claims.

What is claimed and desired to be secured by Letters Patent of the United States is:

1. A device for measuring the mass of a flowing medium, in particular for measuring the mass of air aspirated by internal combustion engines, having at least one temperature-dependent resistor disposed in the flow of the medium, a characteristic of which resistor is regulated in accordance with the flowing mass as a control variable, said control variable forming a standard for measuring the mass of the flowing medium, characterized in that the temperature-dependent resistor is embodied as a hot wire provided with at least one intermediate support point and two terminal support points, said at least one intermediate support point yields elastically, whereby external forces acting on said support point are isolated from causing permanent deformation of the hot wire, and further characterized in that movement of said support point that deforms elastically is restricted by a stop.

2. A device as defined by claim 1, further characterized in that the support point which yields elastically is disposed substantially centrally between the terminal support points, said terminal support points being associated with ends of said temperature-dependent resistor.

3. A device as defined by claim 2, wherein said characteristic comprises temperature.

4. A device as defined by claim 2, wherein said characteristic comprises resistance.

5. A device as defined by claim 2, wherein said characteristic comprises temperature and resistance.

6. A device for measuring the mass of a flowing medium, in particular for measuring the mass of air aspirated by internal combustion engines, including at least one temperature-dependent resistor disposed in the flow of said medium, a characteristic of which resistor is controlled in accordance with the flowing mass as a control variable, said control variable forming a standard for measuring the mass of the flowing medium, characterized in that said temperature-dependent resistor is embodied as a hot strip provided with at least one intermediate support point and two terminal supporting points, said at least one intermediate support point yields elastically, whereby external forces acting on said support point are isolated from causing permanent deformation of the hot strip, and further characterized in that movement of said support point that deforms elastically is restricted by a stop.

7. A device as defined by claim 6, further characterized in that the support point which yields elastically is disposed substantially centrally between the terminal support points, said terminal support points being associated with ends of said temperature-dependent resistor.

8. A device as defined by claim 7, wherein said characteristic comprises temperature.

9. A device as defined by claim 7, wherein said characteristic comprises resistance.

10. A device as defined by claim 7, wherein said characteristic comprises temperature and resistance.

* * * * *